United States Patent [19]
Chang et al.
[11] Patent Number: 4,503,099
[45] Date of Patent: Mar. 5, 1985

[54] HEAT TRANSFER SURFACES HAVING SCALE RESISTANT POLYMER COATINGS THEREON

[75] Inventors: Franklin S. Chang; James A. Towers, both of Mt. Prospect, Ill.

[73] Assignee: Borg-Warner Corporation, Chicago, Ill.

[21] Appl. No.: 504,564

[22] Filed: Jun. 15, 1983

[51] Int. Cl.[3] .......................... B32B 17/06; C23C 1/10

[52] U.S. Cl. .............................. 428/425.8; 106/14.13; 106/14.15; 106/14.21; 106/14.44; 106/14.45; 148/6.2; 148/6.24; 148/6.27; 427/388.4; 428/461; 428/462; 428/463; 428/500; 428/521; 428/522; 524/401; 524/407; 524/415; 524/418; 524/428; 524/546; 524/558; 524/575; 524/591

[58] Field of Search ...................... 148/6.24, 6.2, 6.27; 106/14.15, 14.21, 14.13, 14.45, 14.44; 524/428, 418, 401, 407, 575, 415, 591, 558, 546; 427/388.4; 428/462, 461, 463, 457, 425.8, 500, 522, 521

[56] References Cited

U.S. PATENT DOCUMENTS

| | | | |
|---|---|---|---|
| 3,444,007 | 5/1969 | Mauer et al. | 148/6.2 |
| 3,585,084 | 6/1971 | Steinbrecher et al. | 148/6.2 |
| 3,630,791 | 12/1971 | Yamagishi et al. | 148/6.2 |
| 4,138,276 | 2/1979 | Miller | 148/6.2 |
| 4,381,203 | 4/1983 | Reinhold | 148/6.28 |

FOREIGN PATENT DOCUMENTS

| | | |
|---|---|---|
| 2409987 | 9/1974 | Fed. Rep. of Germany . |
| 1309356 | 3/1973 | United Kingdom . |

OTHER PUBLICATIONS

"Chemiphoresis, etc.", D. C. Preive et al., *Ind. Eng. Chem. Prod. Res. Dev.* 17 pp. 32–36, (1978).

*Primary Examiner*—Norman Morgenstern
*Assistant Examiner*—Janyce A. Bell
*Attorney, Agent, or Firm*—Richard J. Schlott

[57] ABSTRACT

A variety of coating resin latices may be deposited on metallic surfaces in the form of thin, pin hole-free polymer films from an alkaline latex comprising the coating latex, a cyanide salt and a water-soluble oxidizing agent. The coated substrates are resistant to fouling and to deposition of scale deposits when employed as heat transfer surfaces in cooling systems.

7 Claims, No Drawings

HEAT TRANSFER SURFACES HAVING SCALE RESISTANT POLYMER COATINGS THEREON

BACKGROUND OF THE INVENTION

This invention relates to a method for making the heat transfer surfaces of cooling water systems and boilers resistant to the formation of scale deposits and fouling. More particularly the invention relates to a method for the chemiphoretic coating of metallic heat transfer surfaces with a polymer latex, thereby rendering the surfaces resistant to the deposition of scale and fouling, and to metallic surfaces coated by the process of this invention.

In heat exchange equipment, the formation of scale and fouling on surfaces in contact with aqueous fluids lowers the heat transfer efficiency of the surface and can cause overheating and damage. Scaling is caused by crystallization and/or precipitation of salts, mainly calcium carbonate, to form a hard adherent layer on the surface. Such scale may be controlled by pretreatment to remove scale-forming constituents or by increasing or broadening the solubility of scale-forming salts through use of dispersants, often coupled with blowdown procedures to remove accumulated sludges and to lower the concentration of dissolved solids. Although many such prior art methods exist which markedly reduce the scaling rate, these do not completely eliminate the problem and with time, scaling becomes sufficient to reduce efficiency and require cleaning and/or replacement of the heat transfer surfaces.

Heat transfer surfaces exposed to aqueous fluids are made markedly resistant to the deposition of adherent scale by coating with plasma polymerized fluoroethylene monomer such as tetrafluoroethylene, as is shown, for example, in U.S. Pat. No. 4,125,152. Plasma polymerization provides poly(tetrafluoroethylene) PTFE coatings on substrates which, being uniform and very thin, do not significantly affect heat transfer properties of heat transfer surfaces. Although the resulting surfaces are usefully resistant to scale deposition and fouling, the difficulty of forming such coatings in areas having restricted access, such as, for example, upon the inner surfaces of heat exchange tubing and the like, mitigates against wide-spread applicability for use in a variety of commonly employed heat exchange devices.

A method for the deposition of uniform coatings on ferriferrous surfaces from polymer latices was described in 1971 by Steinbrecher, et al, U.S. Pat. No. 3,585,084. The process, now termed chemiphoresis, depends upon the etching and dissolution of ferrous ions from steel surfaces by the acidic latex compositions. The resulting high concentration of ions at the surface tends to destabilize the latex next to the steel surface, causing film deposition to occur. More recently, T. Nishida, et al in German Patent Application OS 2,409,987, published Sept. 26, 1974, disclosed a chemiphoretic process for latex deposition on a variety of metallic substrates including copper and aluminum. According to Nishida et al, the Steinbrecher process had application only to ferriferrous metal surfaces by virture of the fact that such materials as lead, copper and the like were etched too slowly by the acidic latex, thus producing only a slow buildup of metallic ions which in turn was insufficient to cause adequate film deposition on non-ferrous surfaces. Nishida's method overcomes the limitations of the Steinbrecher coating process by addition of metallic ions to the latex composition at a concentration near the critical limit value. The latex compositions of Nishida et al further contain an acid capable of etching the metal surface, thereby providing a sufficient increase in metallic ion concentration at the surface to destabilize the latex and cause film deposition on the surface. Nishida et al note that the inclusion of oxidizing agents such as hydrogen peroxide also may be useful in the practice of that process to speed the deposition and consequently increase the thickness of the coating. The Nishida et al process and the Steinbrecher et al process require acidic conditions and the coating latex compositions are adjusted to a pH in the range of from 1.6 to 5.0. Above the specified range, little or no coating takes place.

Many desirable coating resin latices are commercially available that are not stable under acidic conditions and cannot therefore be used in these prior art processes. A method for depositing such coating resins from a neutral or alkaline latex upon metallic substrates and particularly upon copper and aluminum substrates would greatly increase the range of coating resins available to the industry for use with such substrates and would thus be a significant advance in the coating art.

BRIEF DESCRIPTION OF THE INVENTION

This invention is a process for the deposition of uniform, thin, pin-hole free polymer films from a latex under neutral or alkaline conditions upon aluminum and copper surfaces. The resulting coatings markedly improve the resistance of heat transfer surfaces to the deposition of adherent scale, fouling and corrosion when in contact with aqueous fluids.

DETAILED DESCRIPTION OF THE INVENTION

The process of this invention employs an alkaline aqueous latex composition containing an oxidizing agent and a cyanide salt to chemiphoretically deposit polymer films upon copper or aluminum surfaces. The resulting thin films are adequately coalesced and do not require further heat treatment or surface oxidation to be useful for the prevention of adherent scale deposition.

The polymer latices useful for the purposes of this invention include latices of any of the conventional coating resins including, for example, fluorocarbon polymer latices, styrene-butadiene copolymer latices, acrylic resin latices, polyurethane latices, ethylenevinyl acetate latices, epoxy resin latices and the like, as well as mixtures thereof. Such coating latices are well-known and readily available from commercial sources.

In preparing the polymer latex for use in the practice of this invention, the latex is first diluted by mixing with sufficient water to provide a composition containing from about 2 to about 10 wt% polymer solids. The pH of the composition is then adjusted to a value in the range of from about 7 to about 12 by the addition of an alkali such as an alkali metal hydroxide or aqueous ammonia. To the stirred alkaline latex is then added from 0.05 to 2, preferably about 0.1 to about 0.5 wt% of a cyanide salt such as sodium cyanide, based on final latex composition, and from 0.1 to 3, preferably from about 0.75 wt% to about 2, based on final latex solution, of a water-soluble oxidizing agent such as an alkali metal persulfate, an organic peroxide, or an alkali metal chromate salt.

Coating of copper or aluminum heat exchange surfaces is accomplished according to the practice of this invention by contacting the surfaces with the latex composition for a period of from about 1 to about 60 minutes, preferably from 10 to 30 minutes, then removing the latex composition, rinsing the surface with water and air drying the coating, preferably at an elevated temperature. While the coating process may be carried out at any temperature between the freezing point and the boiling point of the aqueous composition it is both desirable and convenient to carry out the coating process at ambient temperatures in the range 12° to 38° C. Prolonged exposure of the latex composition to extremes of temperature, and particularly to elevated temperatures, tends to produce premature coagulation and deterioration.

It will be apparent from the foregoing description that the process of this invention differs from the prior art processes in that the instant process is accomplished under neutral or alkaline conditions and without the addition of metallic ions previously required to accomplish the deposition of polymer films on aluminum or copper surfaces. Further, the coatings are useful in the preventing of scale deposition and fouling without requiring further oxidation or thermal treatment to fuse or coalesce the film.

Coatings prepared by the process of this invention are very thin, generally less than 10 microns, preferably less than 5 microns in thickness. For the purposes of this invention, very thin coatings are preferred since polymeric coatings generally have a deleterious effect on heat transfer properties and these effects will be minimized by employing the thinnest possible coatings.

EXAMPLES

In the following Examples, metallic coupons 1¼"×¾"×0.06" were coated with a coating resin. The samples were prepared by first scrubbing the surfaces of the metal coupons with soap and water, rinsing with water and with acetone, then air drying. The dry coupons were then immersed in the coating composition for a period of from 1 to 30 minutes, removed, rinsed with water and air dried, either at room temperature or in a circulating air oven at 125° C.

Scaling tests were run by immersing the coupons in a supersaturated aqueous calcium carbonate solution (pH=9) for a period of 18 hours at room temperature. The scaled coupons were removed from the calcium carbonate solution, rinsed with 200 ml of deionized water, then dried by first rinsing with acetone, then ethanol and blown with a nitrogen stream. The amount of adherent scale was determined by dissolving the scale with 3N. HCl and determining the amount of calcium as PPM/$CaCO_3$ by atomic absorption spectroscopy.

TABLE I

Coatings on Copper

| Example No. | Latex Type[2] | Latex Wt % Solids | NaCN Wt % | $(NH_4)_2S_2O_8$ Wt % | pH[1] | Coating Microns |
|---|---|---|---|---|---|---|
| 1 | SBR | 6.5 | 0.4 | 1.9 | 8 | 2-3 |
| 2 | SBR | 6.5 | 0.3 | 0.5 | 10 | 2-3 |
| 3 | SBR | 5.0 | 0.3 | 1.7 | 11.3 | 1 |
| 4 | SBR | 6.0 | 0.3 | — | 11 | 0 |
| 5 | Acrylic | 5 | 0.1 | 1.7 | 10 | 2-3 |
| 6 | Urethane 1 | 4.5 | 0.3 | — | 11 | 0 |
| 7 | Urethane 1 | 3.0 | 0.15 | 1.7 | 11.5 | <1 |
| 8 | Urethane 2 | 4.0 | 0.15 | 1.7 | 11.5 | 4 |
| 9 | TFE | 8 | 0.3 | (3) | — | 2-3 |
| 10 | Urethane 1 | 5.0 | 0.3 | 1.7 | 11 | 1 |

TABLE I-continued

Coatings on Copper

| Example No. | Latex Type[2] | Latex Wt % Solids | NaCN Wt % | $(NH_4)_2S_2O_8$ Wt % | pH[1] | Coating Microns |
|---|---|---|---|---|---|---|
| | Epoxy | 0.4 | | | | |

Notes:
[1]pH adjusted to value shown with 27% aqueous ammonia.
[2]TFE = Tetrafluoroethylene polymer latex TE-3170, from E. I. duPont Co.; SBR = Carboxylated Styrene Butadiene Latex T-70, from Goodyear Chemicals Co.; Urethane 1 = aliphatic urethane latex W-231 from Witco Chemical Co.; Urethane 2 = aliphatic polyurethane latex WX6545, from Wilmington Chemical Corp.; Epoxy = Epoxy Latex XU253 from Ciba-Geigy Corp. Acrylic = Carboxy-modified reactive polyacrylic latex 2600 from B. F. Goodrich.
[3]Mixture of 0.4 wt % $K_2S_2O_8$, 0.8 wt % $NaCrO_4$, 1.6 wt % HCOONa and 0.3 wt % $KClO_4$.
[4]Coating thickness estimated by visual microscopic examination.

It will be apparent from these data that the process of this invention is effective in depositing thin polymer films on copper surfaces. The coatings were visually examined microscopically to estimate coating thickness; these generally were in the range 1-5 microns thick and were continuous and pin-hole free. Extended immersion times beyond 30 minutes do not appear to materially increase this coating thickness. In control Examples 4 and 6, no visible coating was deposited. In separate control examples omitting the cyanide component, coatings were deposited in clumps and were not adhered to the substrate.

Scale deposition tests were run to demonstrate the efficiency in reducing scale formation. The results are summarized in Table II. In the following Examples 11 and 12, coupons were coated as before by the process of this invention using substantially the process of Examples 2 and 5, respectively. In the following Examples 13-15, sections of copper tubing were coated by circulating a latex prepared according to Examples 8, 10 and 2, respectively, through cleaned 4 in. lengths of ¾ in. copper tubing for a period of 10 to 30 minutes, then rinsing and drying the tubing. Scaling tests on the tubing were then carried out by circulating the calcium carbonate solution through the tubing segments.

TABLE II

Scale Deposition Tests

| Example No. | Coating | Scale[(3)] Reduction (%) |
|---|---|---|
| Control[(1)] | None | 0 |
| 11[(1)] | SBR | 50 |
| 12[(1)] | Acrylic | 40 |
| Control[(2)] | None | 0 |
| 13[(2)] | Urethane | 65 |
| 14[(2)] | Urethane Epoxy | 65 |
| 15[(2)] | SBR | 30 |

Note:
[(1)]Coat coupons.
[(2)]Coated tubing.
[(3)]Efficiency is reduction in scale deposition as percentage of deposition on control coupon.

It will be apparent from these data that the deposition of thin polymer films on metallic surfaces by the process of this invention provides a marked improvement in the resistance to scale deposition.

EXAMPLE 16

An aluminum coupon was coated employing the composition of Example 5. The resulting coating was tightly adhered to the surface and continuous by visual inspection.

The invention will thus be seen to be a process for coating metallic surfaces with thin polymer films comprising contacting a metallic surface selected from the group consisting of copper and aluminum with a polymer latex comprising from 1 to 10 wt% latex solids, from about 0.05 to about 2 wt% of a cyanide salt and from about 0.1 to about 3 wt% of a water-soluble oxidizing agent selected from the group consisting of an inorganic persulfate such as an ammonium or alkali metal persulfate, an alkali metal chromate or an alkali metal perchlorate or a mixture thereof at a pH of from about 7 to about 12, said pH adjustment being accomplished by the addition of an aqueous caustic such as aqueous ammonia, an alkali metal hydroxide, or a mixture thereof. The resulting coated surfaces are useful as heat exchange surfaces, exhibiting marked reduction in scale deposition. It will be understood by those skilled in the art that the process of this invention will be applicable generally for coating copper and aluminum substrates as well as for coating alloys comprising a major amount of copper or aluminum and minor amounts of additive metallic components intended to increase the durability, hardness and similar characteristics of the substrate. These and other variations that may thus be accomplished by those skilled in the art will not depart from the spirit and scope of the invention which is defined by the appended claims.

We claim:

1. A process for coating a surface of a metallic substrate comprising contacting at least one surface of said substrate with a polymer latex composition comprising from about 1 to about 10 wt% polymer latex solids, from about 0.05 to about 2 wt% of a sodium cyanide and from about 0.1 to about 3 wt% of a water-soluble oxidizing agent selected from the group consisting of an inorganic persulfate, an alkali metal chromate, an alkali metal perchlorate and mixtures thereof, and sufficient aqueous caustic to provide a pH in the range of from about 7 to about 12.

2. The process of claim 1 wherein said metallic substrate is selected from the group consisting of copper substrates and aluminum substrates.

3. The process of claim 1 wherein said aqueous caustic is aqueous ammonium hydroxide.

4. A metallic substrate having a coating on at least one surface, said coating having been deposited thereon by the step of contacting said surface with a polymer latex composition comprising from about 1 to about 10 wt% polymer latex solids, from about 0.05 to about 2 wt% of a sodium cyanide, and from about 0.1 to about 3 wt% of a water-soluble oxidizing agent selected from the group consisting of an inorganic persulfate, an alkali metal chromate, an alkali metal perchlorate and mixtures thereof and sufficient aqueous ammonium hydroxide to provide a pH in the range of from about 7 to about 12.

5. An aqueous polymer coating latex composition adapted for coating metallic substrates comprising from about 1 to about 10 wt% of polymer latex solids, from about 0.05 to about 2 wt% of a sodium cyanide and from about 0.1 to about 3 wt% of a water soluble oxidizing agent selected from the group consisting of an inorganic persulfate, an alkali metal chromate, an alkali metal perchlorate and mixtures thereof and sufficient aqueous ammonium hydroxide to provide a pH in the range of from about 7 to about 12.

6. The composition of claim 1 wherein said oxidizing agent is ammonium persulfate.

7. The composition of claim 6 wherein said polymer coating latex solids is selected from the group consisting of a styrene-butadiene copolymer coating latex, an acrylic coating resin latex, and polyurethane coating latex, a fluorocarbon polymer coating latex, and mixtures thereof.

* * * * *